Jan. 25, 1938.   A. J. E. RYLANDER ET AL   2,106,537
PRESSURE CONTROLLING VALVE
Filed Aug. 24, 1934   2 Sheets-Sheet 1

Inventors
Anders J. E. Rylander, and
Karl G. V. Rylander.

By William C. Linton
Attorney.

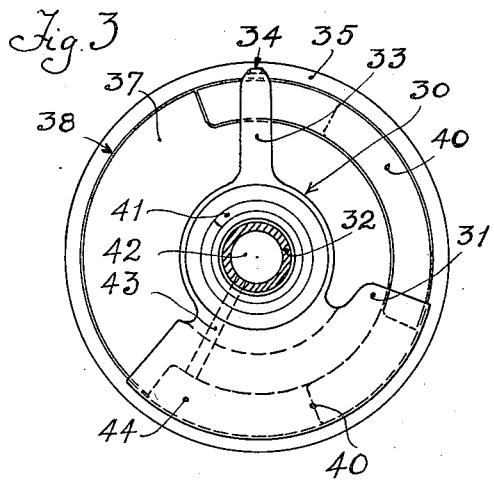
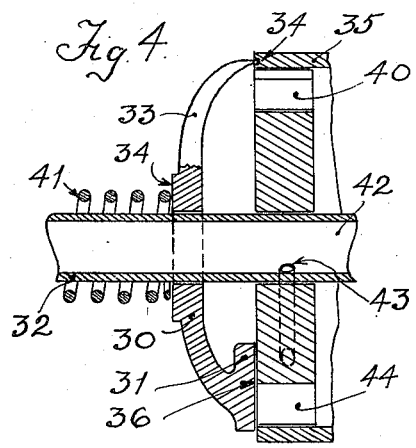
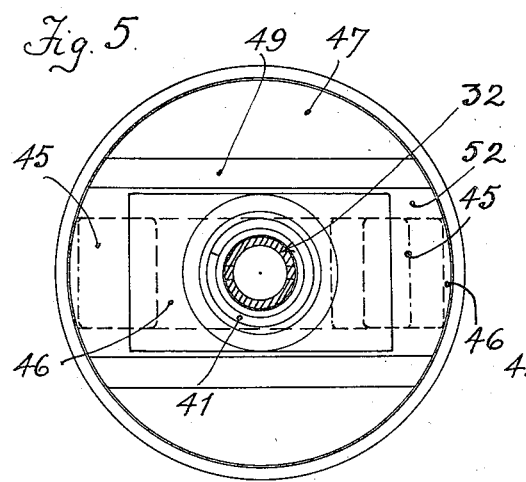
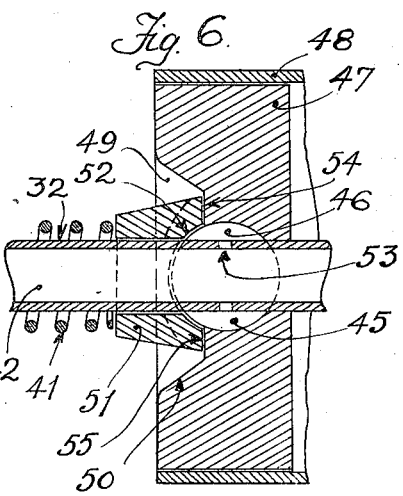
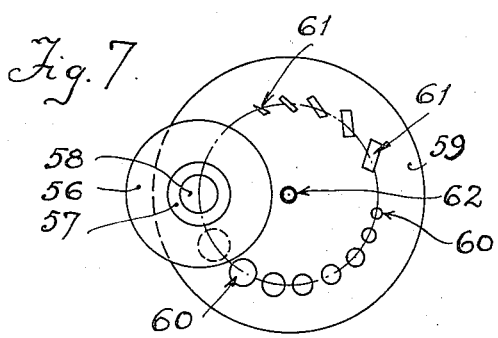

Patented Jan. 25, 1938

2,106,537

UNITED STATES PATENT OFFICE 2,106,537

PRESSURE CONTROLLING VALVE

Anders Johan Emil Rylander and Karl Gustav Vilhelm Rylander, Stockholm, Sweden

Application August 24, 1934, Serial No. 741,320
In Sweden August 24, 1933

5 Claims. (Cl. 137—53)

Pressure controlling members hitherto known, e. g. spring-actuated valves or the like cannot be regarded as real precision valves as not permitting adjustment to varying values of the pressure with requisite exactness. This drawback depends on the known fact that when setting spring-actuated valves to varying values of pressure, such forces often arise which are uncontrollable and may arise or be promoted by the changes in position to which the spring is subjected at its adjustment to varying pressure conditions. Consequently, it has not been possible, by means of adjustable valves of this type, to effect an exact adjustment to a given pressure. On the other hand, if the tension of the spring has been definitely adjusted to a given pressure and the spring has not afterwards been subjected to any change in position as a result of the adjustment, the resiliency of the spring has shown to correspond to the pressure for which the valve is adjusted.

The present invention is based on the above observations and the characterizing feature of same resides in the fact that pressure controlling member or members, e. g. valves or the like, are adjusted to varying values of pressure exclusively or mainly by increasing or decreasing the pressure exposed surface or surfaces of the acting member.

Further the invention is characterized by the provision in the fluid path to the pressure exposed acting member of the controlling member of changeable or adjustable members capable of effecting said change of the pressure surfaces, that is the pressure fields.

A still further feature characterizing the invention resides in special arrangements of the changeable members which may be formed as displaceable slides or the like to be more fully described in the following description.

The invention enables the adjustment of the valve to a given pressure solely by increasing or decreasing the pressure surface. Consequently, it is not required to vary the tension of the spring or springs actuating the valve member and, thus, no incalculable and uncontrollable forces or factors arise in setting the valve. In order to enable the valve according to the invention to operate exactly, it is, however, necessary that the surfaces of the movable member have a completely tight fit which is quite possible to attain by means of the grinding methods now at disposal.

The invention is illustrated on the accompanying drawings as applied, by way of example, to a valve serving as pressure gauge and having its most important application on inflating pneumatic tires.

In the drawings:—

Figure 1:
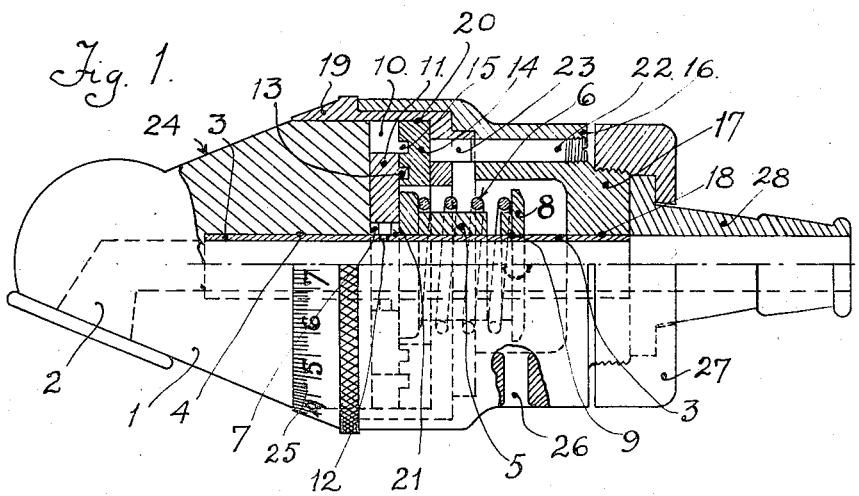
Fig. 1 is a partial longitudinal sectional view of the valve.

Figs. 3, 4, 5, and 6 respectively illustrate from the side and in a longitudinal section certain performances of the pressure actuated member and in Fig. 7 is shown schematically the action of the slide that regulates the pressure surface.

Similar to pressure gauge valve devices hitherto known, the present valve device has for its object by means of a safety valve provided in the device to prevent the formation of too high pressures in the tires. For this purpose, a spring actuating the valve body has heretofore been provided having means for varying its tension by change in position. However, in such cases the drawbacks above set forth will set in. By applying the precision valve according to the invention to the valve device shown, these drawbacks have been eliminated.

In the drawings 1 designates the pump nipple provided with an air channel 2. Soldered to the pipe in said channel 2, with its one end as shown at 4, is a pipe 3 having its other end threaded. 5 designates an annular valve member axially displaceable on the pipe 3 and held resiliently pressed against an annular disk 7 by means of a spring 6, said disk 7 being soldered to the pipe as at 21. An annular nut 8 serves as abutment for the spring 6, said nut being soldered to the pipe 3 as shown at 9 after having been threaded on said pipe to such a position as to give to the spring the exact tension desired. Provided in the disk 7 are two radially extending recesses 10 serving each as guidance for a plain slide valve 11. Opening at the bottom of the radial recesses are channels 12 communicating with the interior of the pipe 3. The slide valves 11 are each provided with a guide cam 13 engaging a flat spiral thread 15 provided in a disk 14. Threaded on the pipe 3 with a hub-shaped part 17 is a sleeve 16 soldered to said pipe as at 18. Rotatably mounted between the pump nipple 1 and the sleeve 16, is a ring 19 extending with its one roughed edge through a little distance beyond the pump nipple. The ring 19 and the disk 14 are fixed in position relatively to each other by soldering as at 20. Consequently, the disk 14 will be rotated together with the ring 19 when the latter is rotated relatively to the pump nipple 1 and all parts connected to the pipe 3. In order to limit the movement of the parts movable relatively to each other and to prevent the plain slide valves 11 from being damaged due to an extended rotation, a screw spindle 22 is rigidly inserted into the sleeve 16, said spindle co-operating with a pin 23 secured to the ring 19, the co-operation of these parts causing the rotation to be limited to one revolution. The pitch of the thread 15 should be calculated so as to cause the plain slide valves 11 which on rotation of the disk 14 are displaced by the thread to bear on the recesses without exercising any strong pressure, when the pins occupy the position shown in the drawings. When then the parts are rotated in such a direction as to cause the pins to be withdrawn from each other, the pressure surface of the valve member will be laid free, the greatest exposed pressure surface being effected, when the pins again meet each other.

From the above description it is clear that an adjustment of the valve to a given pressure can be made exclusively by increasing or decreasing the pressure surface and without any uncontrollable forces arising in the spring 6 due to change in position of the latter. In order to facilitate the adjustment, the pump nipple 1 may on its outside be provided with a groove and the ring 19 with a corresponding graduation. When on inflation the desired pressure has been attained, the super-pressure acting on the exposed pressure surface will displace the valve member 5 against the action of the spring 6, the compressed air being allowed to escape through holes 26 provided in the sleeve 16. Removably connected to the hub-shaped part 17 of the sleeve 16 by means of an annular nut 27 is a hose union 28. On account of the roughed edge of the ring 19, leaving no sufficient hold for the fingers other than on intentional rotation of said ring, there is no risk for an unintentional rotation. The air being supplied to the tire under pressure through the pipe-like portion or conduit 3 of the pressure indicating and relief valve, will build up in the conduit and in the adjustable, variable capacity recess in the valve seat 5 until the pressure exerted upon the valve 5 by the spring 6 is overcome. The valve 5 will then lift from the seat, permitting escape of air from the conduit 3, through the ports or orifices 12 and into the body of the casing from which it is discharged through the outlet port 26, indicating that a desired pressure has been reached within the tire being inflated. The usual hose coupling or inflating nozzle will then be removed from the tire valve. This pressure control or set 4 for the pressure relief valve 5 is manually effected by rotatably adjusting the dial carrying ring 19 which in turn operates the cam carrying disc 14 to move the slidable members 11 in opposite directions in the valve seat 7 to increase or diminish the size or effective area of the recess in the seat beneath the valve 5, which recess is in constant communication with the conduit 3 through the orifices 12.

Figure 2:
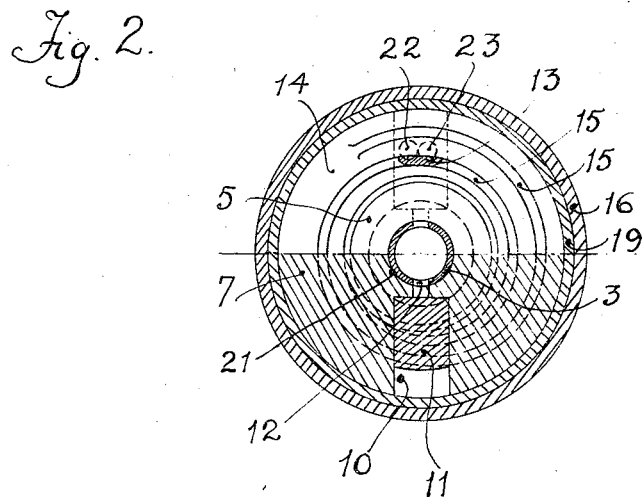
Fig. 2 illustrates in its upper and lower halves two sectional views of the valve.

The performance according to Figs. 3 and 4 differs rather essentially from the performance lately described. The valve part 30 is partially performed with a pressure plate 31 being situated on one side of the pipe 32. On the other side of said pipe is placed a sleeve 33 by means of a point 34 answering to an outside covering 35. The part 31 has a special pressure surface 36 formed as part of an annular ring. This surface is answering to one to the disk 7 corresponding disk 37 which is arranged in the covering 35 and with its outer edge 38 partly (to about two thirds) filling up same. The periphery of the disk is to its greater part furnished with a recess with inner cylinder-shaped bounding-surface 39. The recess occupies, as is shown, the main part of the disk. In this recess is running an adjustable member shaped as a cylinder-formed part-ring 40 occupying approximately half of the space formed between the disk 37 and the covering 35, in which space the said part may be moved. The part 40 may thus be moved not only relatively the disk 37 but also relatively part 31 of the valve member. As in Figs. 1 and 2, the valve member is pressed, by means of a spring 41, against the disk 37 and the parts previously mounted round the pipe 32. Pressure air may pass from the inner channel 42 of this pipe 32 through a channel 43 to the part of that opening between the disk 37 and the covering 35 which is situated below the part 31 (Fig. 3) and marked 44. As is shown in the drawings and from the above description, the arrangement stated in Figs. 3 and 4 is acting thus, that by moving the part 40 (cf. the dotted-lined position), the pressure surface for part 31 of the valve member becomes changed. Evidently, the part 40 may be adjusted relatively the disk 37 and the valve member 30 by means of a suitable member.

The performance shown in Figs. 5 and 6 differs rather essentially from the preceding execution form. As at the arrangement in Figs. 1 and 2 and the movable members 11, there are movable members in the form of two slides 45, here being cylindrical and moving towards centrum of the pipe 32. The slides 45 are moving in the cylindrical channel 46. (There may exist several channels and the slides may be moved independently of each other.) The channel 46 is taken up in the disk 47 which is placed inside the covering 48. In the central part of the disk 47 is made a recess 49 stretching across the disk. In this recess, the slides 45 are partly pushing up. Around the central pipe 32 there is arranged a spring-charged (by means of spring 41) valve member 51 having the outside form rectangular but on its inner side being formed like a part-cylinder which is, with its surface 52, covering certain parts of the slides 45 these being in their outermost position. I. e. when the slides are moved away towards the center of the arrangement (cf. the dotted line in Fig. 5), the slides will be pushed more and more underneath the surfaces 52 which is all the time working against the slides 45, whereby arises the intended action. The inner chamber 42 of the pipe 32 is through a hole 53 kept in communication with the chamber 46.

The arrangement according to Figs. 3 and 4, as well as according to Figs. 5 and 6 may act thus, that the valve members 30, 51 open at the adjustable pressure being attained. According to Figs. 3 and 4, the valve member 30 is moving thus, that same is turning around the point 34 and a small opening arises between the disk 37 and the surface 36. At the arrangement according to Figs. 5 and 6, an opening arises between the surface 52 of the valve member and the slides 45, and furthermore between the surface 54 arranged in the bottom and corresponding to the surface 55 of the valve member in axial direction.

In Fig. 7 is shown, how a disk 56 may support a valve member 57. Underneath the disk 56, which is equipped with a hole 58 at its centre, may always be introduced a portion of the disk 59 and the various round holes 60, e. g. the holes 61 of other form, may be placed, wholly or partly, below the hole 58, whereby the surface of the valve member 57 may be more or less changed. The disk 59 is moving around a centre 62.

As aforesaid, the arrangement according to the figures is schematical. There is not shown how the movement between the different parts is effected. Other variants of the performance may be thought.

The application of the present controlling member or valve, as described above and shown in the drawings, is only intended to show the expediency of the valve for articles of small dimensions. Evidently, the valve may be used also for other purposes without departing from the principles of the invention.

The valve according to the invention may be applied to all pressure fluids and at all such places as well as for all such purposes where valves hithertofore known have been used, as for instance in steam boilers, hot water generators, steam drying appliances for dressing machines and all sorts of pressure containers. As the adjusting means of the valve may be constructed very simple and compressed, the valve may be applied to very small articles. The movable member may consist of either a piston or a plain slide valve reciprocable on the pressure surface of the valve member or of a disk swingable to and fro on said surface. By means of one or more guiding pins or the like, the movable member may be arranged to co-operate with a flat spiral thread provided in a rotatable disk or the like so as to cause radial displacement of the pin relatively to the centre of the thread when the disk is rotated. In this case, the disk together with the thread may, if required, for instance in stationary valves, be disposed laterally of the path of the fluid.

We claim:

1. A pressure relief and indicating valve of the character described comprising a casing having a compressed air conduit extending therethrough, a recessed valve seat surrounding said conduit and having its recess in constant communication with the interior of said conduit, a constantly loaded valve also surrounding said conduit and normally seated upon said recessed valve seat, means for adjusting the effective area of the recess in said valve seat covered by said valve, and said casing having an opening for the escape of air therefrom when said valve is raised from its seat.

2. A pressure relief and indicating valve of the character described comprising a casing having a compressed air conduit extending therethrough, a recessed valve seat surrounding said conduit and having its recess in constant communication with the interior of said conduit, a constantly loaded valve also surrounding said conduit and normally seated upon said recessed valve seat, means for adjusting the effective area of the recess in said valve seat covered by said valve, means on the casing having a cam for setting said adjusting means, and said casing having an opening for the escape of pressure therefrom when said valve is raised from its seat.

3. A pressure relief and indicating valve of the character described comprising a casing having a compressed air conduit extending therethrough, a recessed valve seat surrounding said conduit and having its recess in constant communication with the interior of said conduit, a constantly loaded valve also surrounding said conduit and normally seated upon said recessed valve seat, means for adjusting the effective area of the recess in said valve seat covered by said valve, said means comprising a slidable member mounted in the recess in said valve seat, means on the casing having a cam for adjusting said slidable member, and said casing having an opening for the escape of air therefrom when said valve is raised from its seat.

4. A device of the character described comprising a casing, a compressed air conducting pipe extending through said casing, said pipe having an orifice in the wall thereof, a valve seat having a recess of variable effective area surrounding said pipe and communicating with said orifice, a slide member slidably mounted in the recess in said valve seat, cam means arranged to shift the position of said slide member in said valve seat to vary the effective area of said recess, a pressure relief valve normally seated upon said valve seat over the recess therein, and said casing having an opening for the escape of air therefrom when said valve is raised from its seat.

5. A device of the character described comprising a casing, a compressed air conducting pipe extending through said casing, said pipe having oppositely disposed orifices in the wall thereof, a valve seat having recesses of variable effective area surrounding said pipe adjacent said orifices, the recesses in said valve seat being in constant communication with said orifices, slide members slidably mounted in the recesses in said valve seat, a manually operable member rotatably mounted in said casing and having cam grooves formed therein, a projection on each slide member adapted to travel within the grooves of said manually operable member, a spring pressed pressure relief valve normally seated upon said valve seat over the recesses therein, and said casing having an outlet opening for the escape of air from said casing when said valve is raised from its seat.

ANDERS JOHAN EMIL RYLANDER.
KARL GUSTAV VILHELM RYLANDER.